US012729800B2

(12) United States Patent
Han et al.

(10) Patent No.: US 12,729,800 B2
(45) Date of Patent: Sep. 8, 2026

(54) DISPLAY APPARATUS

(71) Applicant: SAMSUNG ELECTRONICS CO., LTD., Suwon-si (KR)

(72) Inventors: Yoongoo Han, Suwon-si (KR); Kyungmin Lee, Suwon-si (KR); Sejun Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 3 days.

(21) Appl. No.: 18/828,251

(22) Filed: Sep. 9, 2024

(65) Prior Publication Data

US 2025/0137572 A1 May 1, 2025

Related U.S. Application Data

(63) Continuation of application No. PCT/KR2024/012844, filed on Aug. 28, 2024.

(30) Foreign Application Priority Data

Oct. 30, 2023 (KR) ........................ 10-2023-0147271

(51) Int. Cl.
*F16M 11/04* (2006.01)
*G09F 9/30* (2006.01)

(52) U.S. Cl.
CPC ........... *F16M 11/041* (2013.01); *G09F 9/301* (2013.01); *F16M 2200/028* (2013.01)

(58) Field of Classification Search
CPC ...... H05K 7/14; H05K 7/1401; H05K 7/1402; H05K 7/1405; F16M 11/041; F16M 2200/028; G09F 9/301

(Continued)

(56) References Cited

U.S. PATENT DOCUMENTS 6,741,460 B2 5/2004 Huang
8,083,193 B2 * 12/2011 Matsui ................. F16M 11/041 248/222.51

(Continued)

FOREIGN PATENT DOCUMENTS

CN 215453652 U 1/2022
JP 9-64564 3/1997

(Continued)

OTHER PUBLICATIONS

International Search Report dated Dec. 11, 2024 for International Application No. PCT/KR2024/012844.

(Continued)

*Primary Examiner* — Terrell L Mckinnon
*Assistant Examiner* — Michael McDuffie
(74) *Attorney, Agent, or Firm* — STAAS & HALSEY LLP

(57) ABSTRACT

A display apparatus including a rear chassis; and a board that is securable to the rear chassis; wherein the rear chassis includes an insertion rib forming an insertion space into which the board is slidably insertable, and a fixing protrusion, and the board includes an insertion portion on an edge of the board and slidably insertable into the insertion space, and a fixing groove, and the rear chassis and the board are configured so that, when the insertion portion of the board is slidably inserted into the insertion space of the rear chassis, the fixing protrusion is inserted into the fixing groove to secure the board to the rear chassis.

15 Claims, 16 Drawing Sheets

(58) Field of Classification Search
USPC .......... 361/752, 753, 754, 756, 759, 679.21, 361/679.22, 679.57, 679.58, 679.6
See application file for complete search history.

(56) References Cited

U.S. PATENT DOCUMENTS

| | | | | |
|---|---|---|---|---|
| 8,699,229 | B2 * | 4/2014 | Masaki | G06F 1/1601 361/752 |
| 8,746,817 | B2 * | 6/2014 | Liang | H05K 5/15 312/223.1 |
| 9,030,819 | B2 * | 5/2015 | He | G11B 33/124 248/222.51 |
| 9,042,092 | B2 * | 5/2015 | Lu | F16M 11/041 361/679.29 |
| 9,706,675 | B2 * | 7/2017 | Hartman | H05K 7/1402 |
| 10,709,026 | B2 | 7/2020 | Kim et al. | |
| 11,224,135 | B2 | 1/2022 | Song et al. | |
| 11,703,919 | B1 * | 7/2023 | Zhong | H05K 7/1487 361/759 |
| 11,732,511 | B1 * | 8/2023 | Lim | G06F 1/1607 248/552 |
| 2009/0141461 | A1 | 6/2009 | Chen | |
| 2013/0279129 | A1 * | 10/2013 | Xie | G06F 1/16 361/752 |
| 2017/0034941 | A1 | 2/2017 | McCurley et al. | |
| 2019/0234588 | A1 | 8/2019 | Lee | |

FOREIGN PATENT DOCUMENTS

| | | |
|---|---|---|
| JP | 11-87935 | 3/1999 |
| JP | 3985168 | 10/2007 |
| JP | 6078089 | 2/2017 |
| KR | 0128674 | 12/1998 |
| KR | 1999-004812 | 2/1999 |
| KR | 0133295 | 4/1999 |
| KR | 10-2008-0003629 | 1/2008 |
| KR | 10-2017-0065786 | 6/2017 |
| KR | 10-1838566 | 4/2018 |
| KR | 10-2021-0085386 | 7/2021 |

OTHER PUBLICATIONS

Written Opinion of the International Searching Authority dated Dec. 11, 2024 for International Application No. PCT/KR2024/012844.

* cited by examiner

DISPLAY APPARATUS

CROSS-REFERENCE TO RELATED APPLICATIONS

This application is a continuation application, under 35 U.S.C. § 111(a), of International Application No. PCT/KR2024/012844, filed on Aug. 28, 2024, which claims priority under 35 U.S.C. § 119 to Korean Patent Application No. 10-2023-0147271, filed on Oct. 30, 2023, in the Korean Intellectual Property Office, the disclosures of which are incorporated by reference herein in their entireties.

TECHNICAL FIELD

The disclosure relates to a display apparatus capable of directly fastening a board to a rear chassis without the use of a separate fastener.

BACKGROUND ART

In general, a display device is a device that displays a screen, such as a monitor, television, or the like. A display device is a type of output device that converts acquired or stored electrical information into visual information and displays such information to a user, and is used in various fields, such as homes and businesses.

Display devices include monitor devices connected to personal computers (PCs) or server computers, portable computer devices, navigation terminal devices, conventional television devices, Internet Protocol Television (IPTV) devices, handheld terminal devices such as smart phones, tablet PCs, personal digital assistants (PDAs) or mobile phones, various display devices used in industry to display images, such as advertisements or films, and various other types of audio/video systems, and the like.

For example, a display device may include a display panel, a light source device that emits light to the display panel, and a rear chassis to which the display panel and the light source device are attached. The rear chassis may be provided with a plurality of boards mounted on the rear chassis to control the operation of the display panel and the light source device or to supply power to the display panel and the light source device.

DISCLOSURE

Technical Problem

An aspect of the disclosure provides a display apparatus capable of directly fastening a board to a rear chassis without using a separate fastener.

Further, an aspect of the disclosure provides a display apparatus capable of minimizing a portion of the total area of a board attached to a rear chassis in which a configuration of circuit components and patterns is restricted.

Further, an aspect of the disclosure provides a display apparatus capable of reducing the size of a board attached to a rear chassis.

Technical tasks to be achieved in this document are not limited to the technical tasks mentioned above, and other technical tasks not mentioned will be clearly understood by those skilled in the art from the description below.

Technical Solution

Aspects of embodiments of the disclosure will be set forth in part in the description which follows and, in part, will be apparent from the description, or may be learned by practice of the presented embodiments.

According to an embodiment of the disclosure, a display apparatus includes a rear chassis; and a board that is securable to the rear chassis; wherein the rear chassis includes an insertion rib forming an insertion space into which the board is slidably insertable, and a fixing protrusion, the board includes an insertion portion on an edge of the board and slidably insertable into the insertion space, and a fixing groove, and the rear chassis and the board are configured so that, when the insertion portion of the board is slidably inserted into the insertion space of the rear chassis, the fixing protrusion is inserted into the fixing groove to secure the board to the rear chassis.

According to an embodiment of the disclosure, the rear chassis may include a guide protrusion configured to guide the board as the insertion portion is being slidably inserted into the insertion space.

According to an embodiment of the disclosure, the board may include a guide hole into which the guide protrusion is insertable.

According to an embodiment of the disclosure, the guide hole may be elongated in a direction in which the board moves as the insertion portion is being slidably inserted into the insertion space so that the board is guided by the guide protrusion when the insertion portion is being slidably inserted into the insertion space.

According to an embodiment of the disclosure, the insertion rib may include a plurality of insertion ribs, and the insertion space is formed by each insertion rib of the plurality of insertion ribs.

According to an embodiment of the disclosure, the insertion portion may include a plurality of insertion portions. Each insertion portion of the plurality of insertion portions may respectively correspond to one insertion rib of the plurality of insertion ribs.

According to an embodiment of the disclosure, the insertion portion may be configured to have an area corresponding to the insertion rib covering a surface of the insertion portion when the insertion portion is inserted into the insertion space.

According to an embodiment of the disclosure, the insertion portion may be a portion of the board in which a configuration of circuit components and patterns is restricted.

According to an embodiment of the disclosure, the board may include an insertion hole into which the fixing protrusion is insertable before the insertion portion is slidably inserted into the insertion space to prevent the board from being lifted by the fixing protrusion.

According to an embodiment of the disclosure, a connector may be mounted on the board. The board may include a protruding rib protruding beyond the connector to prevent damage to the connector when the board is pushed to slidably insert the insertion portion into the insertion space.

According to an embodiment of the disclosure, the guide hole may include a pair of guide holes, and the guide protrusion includes a pair of guide protrusions corresponding to the pair of guide holes.

According to an embodiment of the disclosure, the fixing protrusion may be configured to be slidably insertable into the fixing groove.

According to an embodiment of the disclosure, the fixing groove may be provided in a central portion of a lower edge of the board based on an upward direction in which the insertion portion is slidably inserted into the insertion space.

According to an embodiment of the disclosure, the fixing groove may include a pair of fixing grooves provided respectively on each of left and right sides of a lower edge of the board based on an upward direction in which the insertion portion is inserted into the insertion space.

According to an embodiment of the disclosure, the board may include an auxiliary insertion portion provided in a central portion of the board. The rear chassis may include an auxiliary insertion rib that forms an insertion space into which the auxiliary insertion portion is slidably insertable and is disposed at a position corresponding to the auxiliary insertion portion.

According to an embodiment of the disclosure, a display apparatus includes a rear chassis and a board secured to the rear chassis. The rear chassis includes a insertion rib forming an insertion space into which the board is slidably inserted, a fixing protrusion securing the board inserted into the insertion space, and a guide protrusion guiding the board to be inserted into the insertion space. The board may include an insertion portion provided on an edge of the board and slidably inserted into the insertion space, a fixing groove secured to the fixing protrusions based on the insertion portion being inserted into the insertion space, and a guide hole into which the guide protrusion is inserted and guiding the guide protrusions.

DESCRIPTION OF DRAWINGS

These and/or other aspect of the disclosure will become apparent and more readily appreciated from the following description of embodiments, taken in conjunction with the accompanying drawings listed below.

MODES OF THE INVENTION

Figure 1:
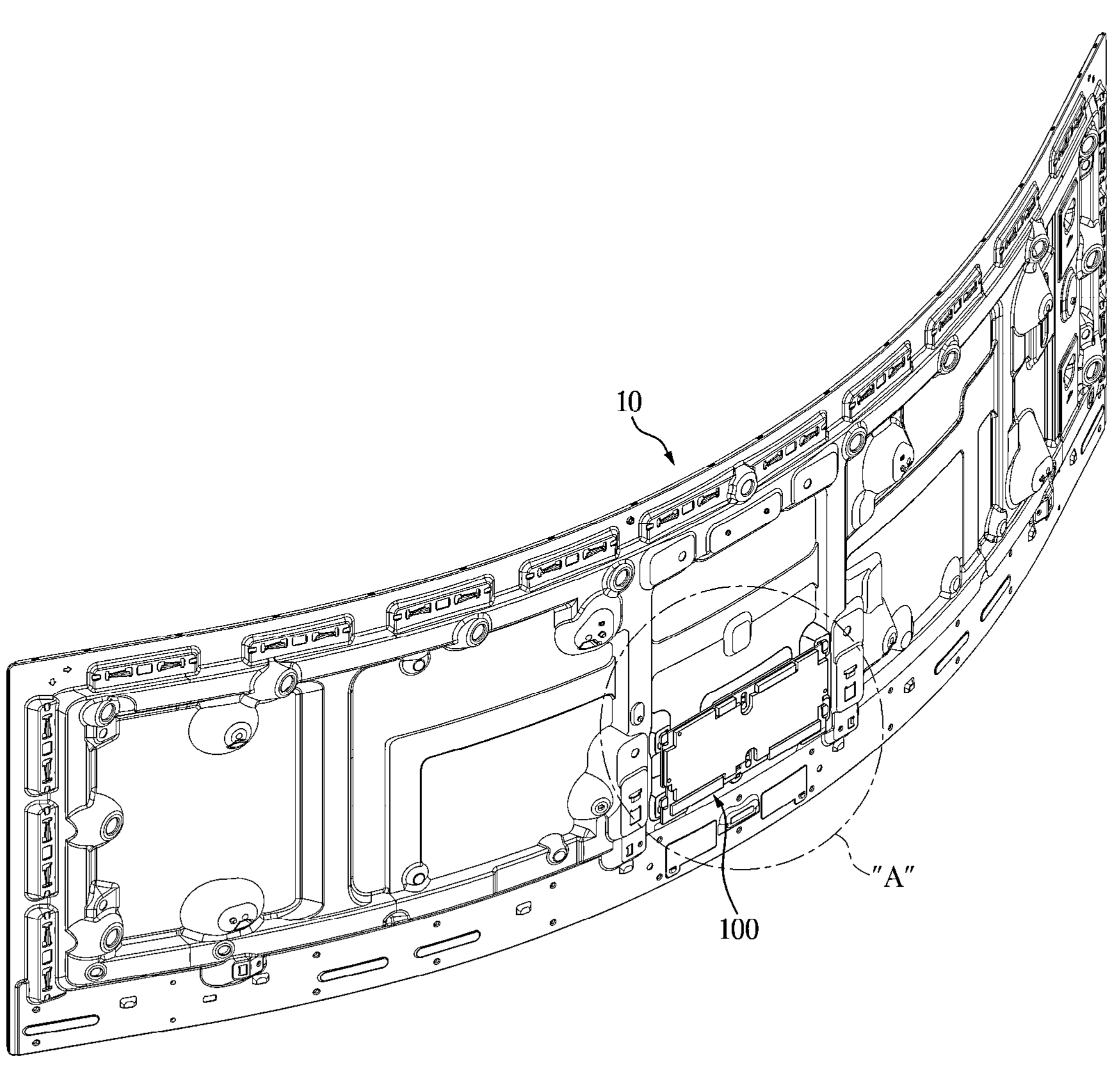
FIG. 1 is a perspective view illustrating a board secured to a rear surface of a rear chassis, according to an embodiment of the disclosure.

Various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless otherwise indicated herein or clearly contradicted by context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "primary", "secondary", etc., may simply be used to distinguish an element from other elements, but is not limited to another aspect (e.g., importance or order) of elements.

Further, as used herein, the terms "front", "rear", "upper", "lower", "side", "left", "right", "top", "bottom", and the like are defined with reference to the drawings, and the shape and position of each component is not limited by these terms.

The terms "including", "having", and the like are used to specify features, numbers, steps, operations, elements, components, or combinations thereof, but do not preclude the presence or addition of one or more of the features, figures, steps, operations, elements, components, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" or "over' another element, this includes not only when the element is in contact with the other element, but also when there is another element between the two elements.

Embodiments of the present disclosure will be described in detail below with reference to the accompanying drawings.

FIG. 1 is a perspective view showing a board secured to a rear surface of a rear chassis according to an embodiment.

As shown in FIG. 1, a display apparatus may be a curved display device. The display apparatus may include an analogue television (TV), a digital TV, a three-dimensional (3D) TV, a smart TV, a light emitting diode (LED) TV, an organic light emitting diode (OLED) TV, a plasma TV, a quantum dot TV, and/or a monitor. However, the display apparatus is not limited to a curved display device, i.e., the display apparatus may be a flat display device.

The display apparatus may include a display module that displays image information, and a stand (not shown) that rotatably supports the display module.

The display module may include a display panel (not shown) that displays an image (e.g., a photo, video, etc.), a backlight unit (not shown) that includes a light source module (not shown) disposed on a rear side of the display panel to emit light to the display panel, and a rear chassis 10 disposed on a rear side of the backlight unit, which is a rear side of the display panel, to which the display panel and the backlight unit are attached. The rear chassis 10 may form a rear exterior of the display apparatus.

A plurality of boards 100 may be secured to a rear side of the rear chassis 10. In the drawings, only one board 100 is secured to a rear surface of the rear chassis 10, but this is only to show the board 100 secured to the rear surface of the rear chassis 10 and the plurality of boards 100 may be secured to the rear surface of the rear chassis 10. The plurality of boards 100 secured to the rear surface of the rear chassis 10 may control the operation of the display panel and the light source module or supply power to the display panel and the light source module.

Figure 2:
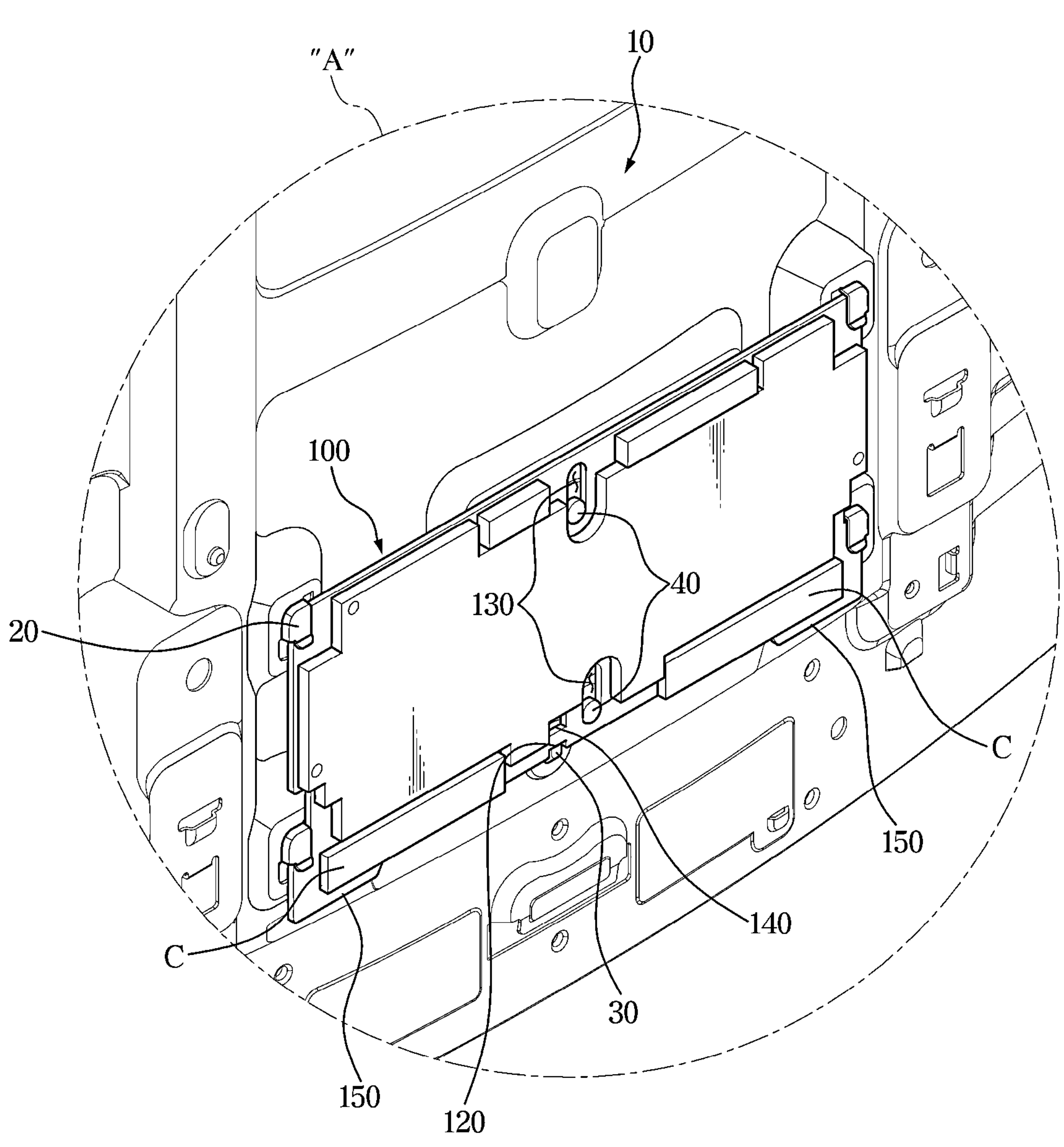
FIG. 2 is an enlarged view of portion A of FIG. 1.
Figure 3:
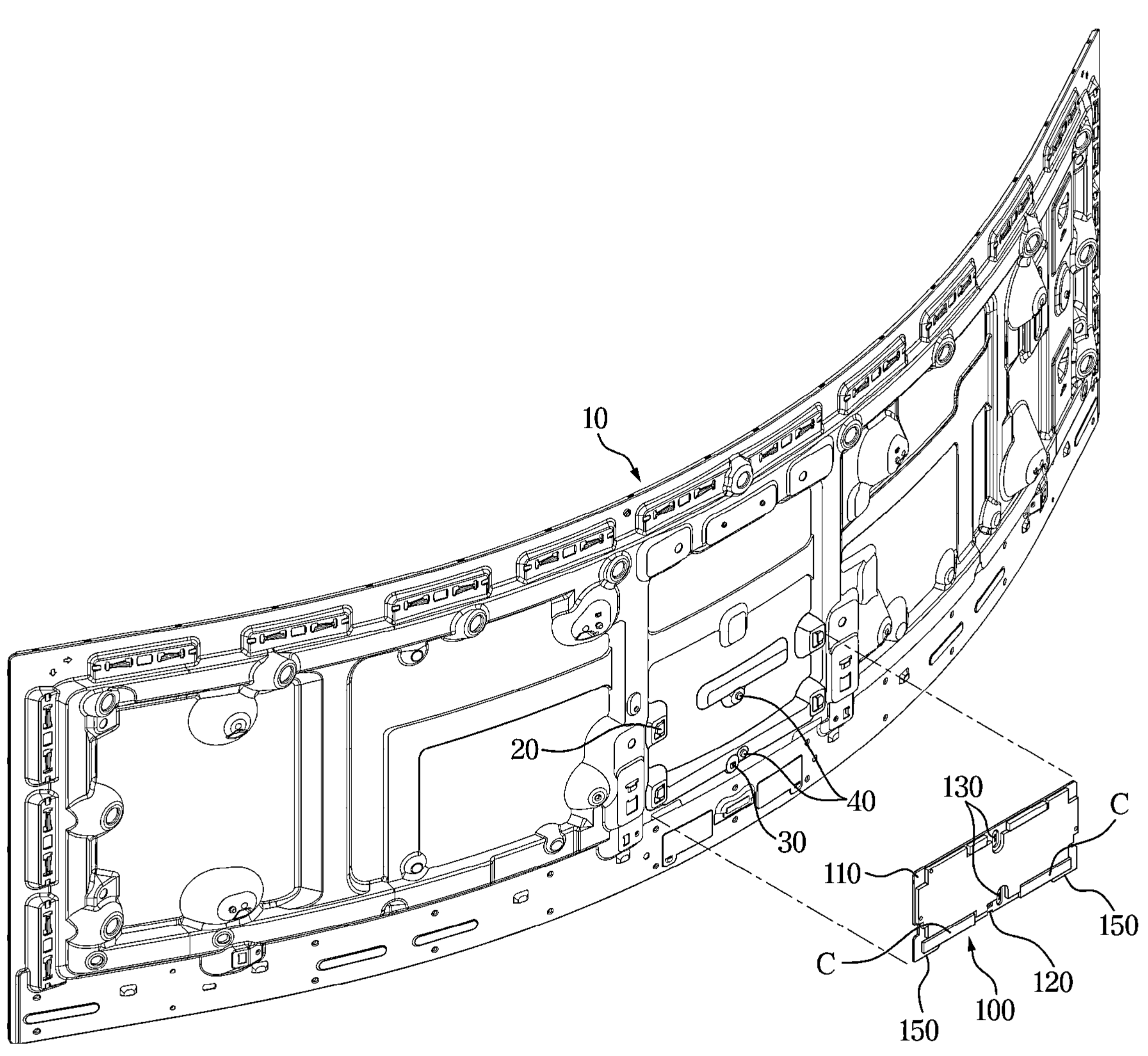
FIG. 3 is a view illustrating the board secured to the rear surface of the rear chassis, according to an embodiment of the disclosure.
Figure 4:
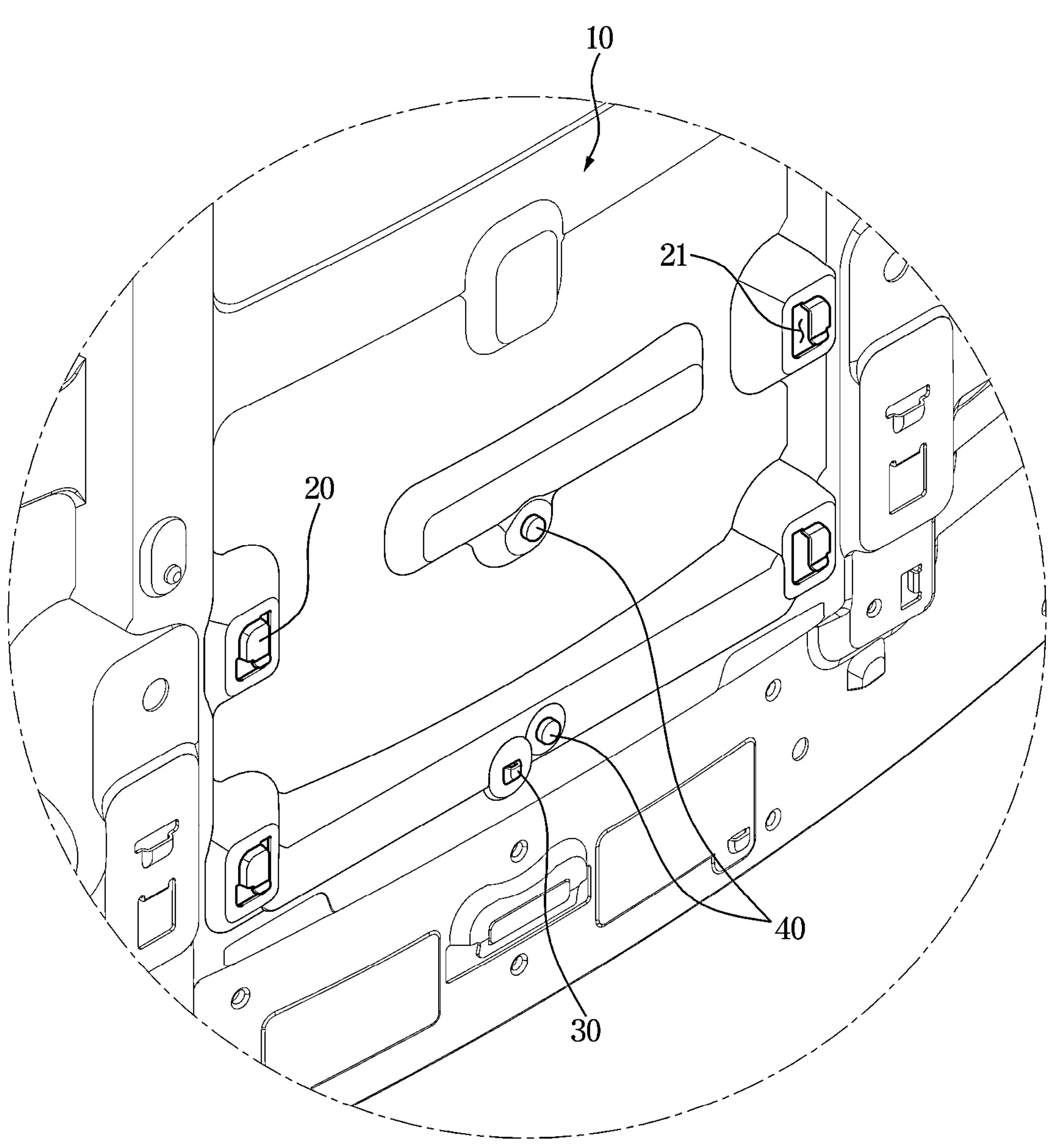
FIG. 4 is an enlarged view illustrating a portion of the rear surface of the rear chassis to which the board is secured, according to an embodiment of the disclosure.
Figure 5:
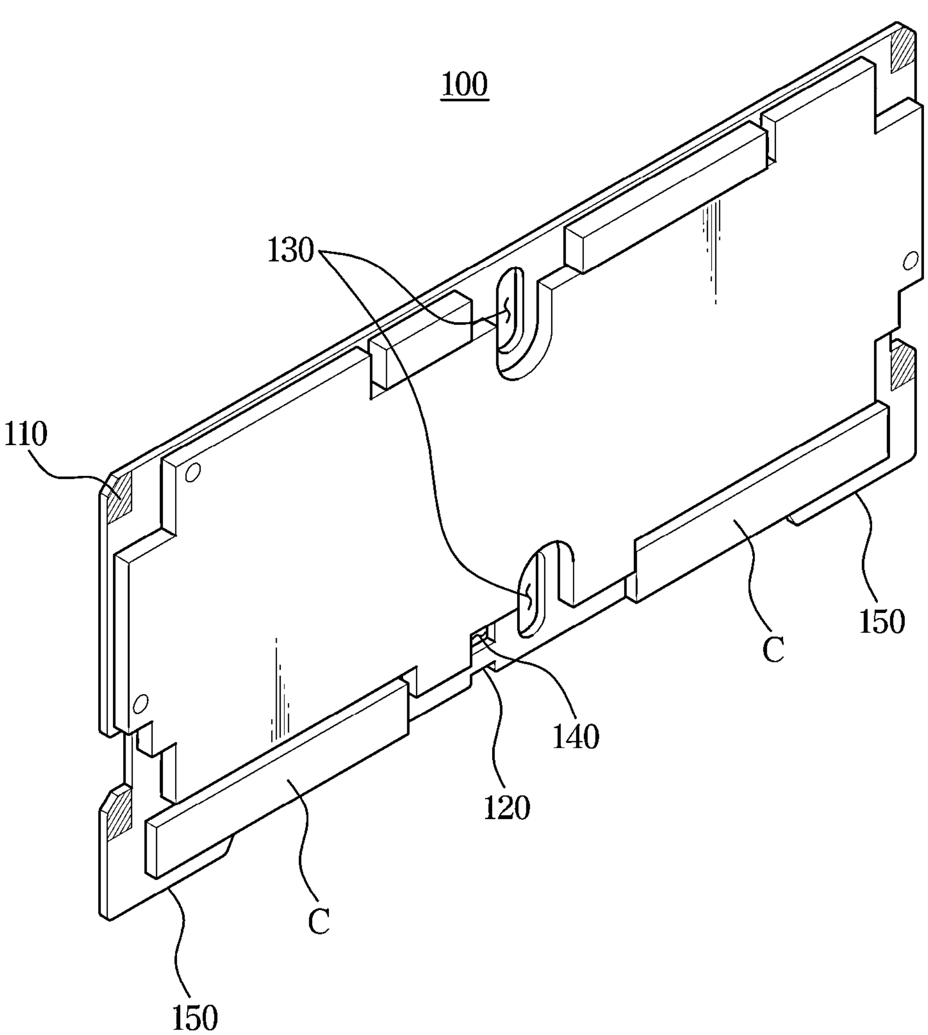
FIG. 5 is a view illustrating the board according to an embodiment of the disclosure.

FIG. 2 is an enlarged view of portion A of FIG. 1. FIG. 3 is a view showing the board secured to the rear surface of the rear chassis according to an embodiment. FIG. 4 is an enlarged view showing a portion of the rear surface of the rear chassis to which the board is secured, according to an embodiment. FIG. 5 is a view showing the board according to an embodiment.

As shown in FIGS. 2 to 5, the board 100 may be secured to the rear surface of the rear chassis 10. The board 100 may be slidably secured to the rear surface of the rear chassis 10.

The rear chassis 10 may include an insertion rib 20 forming an insertion space 21 into which the board 100 is slidably inserted. A plurality of insertion ribs 20 may be provided. The plurality of insertion ribs 20 may each form the insertion space 21. The plurality of insertion ribs 20 may cover an upper portion of the board 100 inserted into the insertion space 21. An insertion portion 110 of the board 100 may be inserted into the insertion space 21 formed by the insertion rib 20. An upper surface of the insertion portion 110 inserted into the insertion space 21 may be covered by the insertion rib 20. In other words, the insertion portion 110 may be provided to have an area corresponding to the insertion rib 20 covering the upper surface of the insertion portion 110. As a result, the insertion portion 110 may occupy only a minimal area of the total area of the board 100. Although four insertion ribs 20 are shown in the drawings, the present disclosure is not limited thereto. In other words, the number of insertion ribs 20 may not be limited as long as the board 100 may be slidably secured to the rear surface of the rear chassis 10.

As described above, the board 100 is not secured to the rear surface of the rear chassis 10 by screws or rugs, but is inserted into the insertion space 21 by a sliding method and secured to the rear chassis 10, thereby reducing material costs. In addition, since the board 100 is secured to the rear surface of the rear chassis 10 by a sliding method, the operator's process cost for securing the board 100 to the rear surface of the rear chassis 10 may be reduced. In addition, since the board 100 is secured to the rear surface of the rear chassis 10 by a sliding method, the work time for securing the board 100 to the rear surface of the rear chassis 10 may be reduced, thereby improving productivity.

The rear chassis 10 may include a fixing protrusion 30 that slides into the insertion space 21 to secure the inserted board 100. The fixing protrusion 30 may be secured to a fixing groove 120 of the board 100. The board 100 slidably inserted into the insertion space 21 may be prevented from moving in response to the fixing groove 120 being secured to the fixing protrusion 30 of the rear chassis 10. In other words, after the board 100 has been slid and secured to the rear surface of the rear chassis 10, it may be prevented from sliding back by an impact or the self-weight of the board in a direction opposite to the direction in which the board 100 is secured, thereby preventing the board from deviating from the insertion space 21.

The rear chassis 10 may include a guide protrusion 40 that guides the board 100 to allow the board 100 to be slidably inserted into the insertion space 21. The guide protrusion 40 may be inserted into a guide hole 130 of the board 100. The guide hole 130 may be formed to be elongated in a direction in which the board 100 is inserted into the insertion space 21 to allow the board 100 to be guided by the guide protrusion 40 when the insertion portion 110 of the board 100 is inserted into the insertion space 21 of the rear chassis 10. In other words, the guide hole 130 may be formed to be elongated in the direction in which the board 100 slides when the board 100 is secured to the rear surface of the rear chassis 10. Since the board 100 is guided by the guide protrusion 40 of the rear chassis 10 and the guide hole 130 of the board 100, the insertion portion 110 of the board 100 may be inserted into the insertion space 21 without being caught by the insertion ribs 20 of the rear chassis 10 when the board 100 is inserted into the insertion space 21. The guide protrusion 40 may be provided in a pair. The guide holes 130 may also be provided in a pair to correspond to the number of guide protrusions 40.

The board 100 may include the insertion portion 110 that is inserted into the insertion space 21 of the rear chassis 10. The insertion portion 110 may be slidably inserted into the insertion space 21 formed by the insertion ribs 20 arranged on the rear surface of the rear chassis 10. The insertion portion 110 may be provided in an edge of the board 100. The insertion portion 110 may be provided in a plurality to correspond to the plurality of insertion ribs 20. In response to the insertion portion 110 being inserted into the insertion space 21 of the rear chassis 10, the insertion portion 110 may be arranged to have an area corresponding to the insertion rib 20 that covers the upper surface of the insertion portion 110. The insertion portion 110 may be a portion where a configuration of circuit components (not shown) and patterns (not shown) provided on the board 100 is restricted. The insertion portion 110 may be formed only at a portion of the edge of the board 100 that is inserted into the insertion space 21. As a result, the insertion portion 110 may occupy only as munch area of the total area of the board 100 as the portion inserted into the insertion space 21.

As described above, since the area of the insertion portion 110 occupies only a minimal area of the total area of the board 100, the size of the board 100 may be minimized. The minimized size of the board 100 may result in reduced material costs. In addition, sufficient space may be secured for the board 100 to be placed. Furthermore, sufficient space may be secured for cables (not shown) disposed at the rear surface of the rear chassis 10.

The board 100 may include the fixing groove 120 secured to the fixing protrusion 30 of the rear chassis 10. After the board 100 has been slid to allow the insertion portion 110 to be inserted into the insertion space 21, the fixing groove 120 may be secured to the fixing protrusion 30 of the rear chassis 10 to prevent movement. In other words, after the board 100 has been slid and secured to the rear surface of the rear chassis 10, it may be prevented from sliding back by an impact or the self-weight of the board in the direction opposite to the direction in which the board 100 is secured, thereby preventing the board from deviating from the insertion space 21.

Based on a direction in which the board 100 is inserted into the insertion space 21 being referred to as upward, the fixing groove 120 may be provided as a single one in a central portion of a lower edge of the board 100. The fixing protrusion 30 of the rear chassis 10 may be provided as a single in a position to hold the fixing groove 120 in response to the insertion portion 110 of the board 100 being inserted into the insertion space 21.

The board 100 may include the guide hole 130 into which the guide protrusion 40 of the rear chassis 10 is inserted. The guide hole 130 may be formed to be elongated in the direction in which the board 100 slides when the board 100 is secured to the rear surface of the rear chassis 10. The guide hole 130 may allow the board 100 to be guided by the guide protrusion 40 when the insertion portion 110 of the board 100 is inserted into the insertion space 21 of the rear chassis 10. Since the board 100 is guided by the guide hole 130 of the board 100 and the guide protrusion 40 of the rear chassis 10, the insertion portion 110 of the board 100 may be inserted into the insertion space 21 without being caught by the insertion ribs 20 of the rear chassis 10 when the board 100 is inserted into the insertion space 21. The guide hole 130 may be provided in a pair. The guide protrusions 40 may also be provided in a pair to correspond to the number of guide holes 130.

The board 100 may include an insertion hole 140 into which the fixing protrusion 30 of the rear chassis 10 is inserted before the board 100 is slid and inserted into the insertion space 21. Because the fixing protrusion 30 of the rear chassis 10 is inserted into the insertion hole 140 before the board 100 is inserted into the insertion space 21, the board 100 may be prevented from being lifted by the fixing protrusion 30. In the event that the board 100 is lifted by the fixing protrusion 30, the insertion portion 110 may catch on the insertion ribs 20 when the board 100 is slid and inserted into the insertion space 21 of the rear chassis 10. However, by inserting the fixing protrusion 30 of the rear chassis 10 into the insertion hole 140 before the board 100 is inserted into the insertion space 21, the board 100 may be easily inserted into the insertion space 21. Because the fixing protrusion 30 is inserted into the insertion hole 140, the insertion hole 140 may be positioned on an upper portion of the fixing groove 120. In other words, with the fixing protrusion 30 of the rear chassis 10 inserted into the insertion hole 140, which is positioned relatively on the upper portion of the board 100, when the board 100 is slid upward, the fixing protrusion 30 may be removed from the insertion hole 140 and then inserted into the fixing groove 120 to prevent the board 100 from moving.

To enable the board 100 to control the operation of the display panel and the light source module or to supply power to the display panel and the light source module, the board 100 may be mounted with a connector C (not shown) to which a cable (not shown) associated with the display panel and the light source module is connected.

The board 100 may include a protruding rib 150 that protrudes further from the connector C so that when the board 100 is pushed to insert into the insertion space 21 of the rear chassis 10, the board 100 may be pushed without touching the connector C. When pushing the board 100, the connector C may be not touched, but rather the protruding rib 150 protruding from the connector C may be touched to push the board 100, thereby preventing damaging to the connector C.

Next, the operation of securing the board 100 to the rear surface of the rear chassis 10 will be described with reference to FIGS. 6 and 7.

Figure 6:
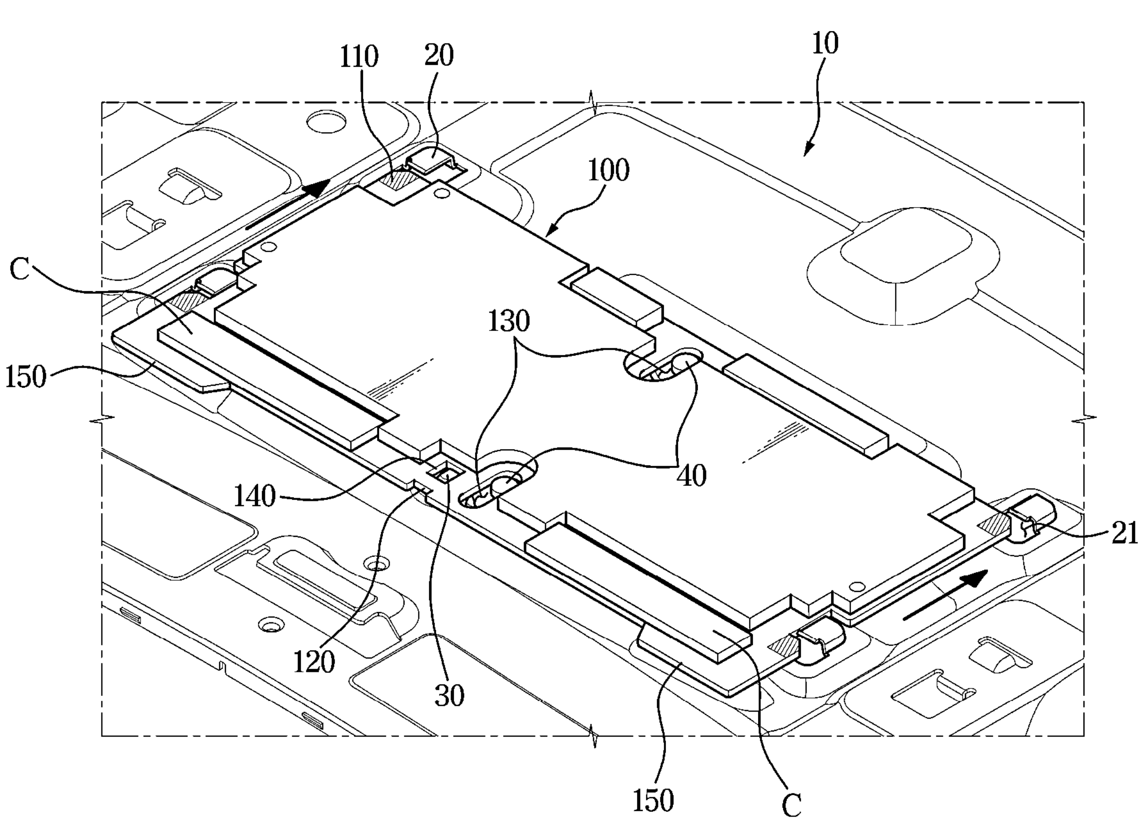
FIG. 6 is a view illustrating the board secured to the rear chassis, according to an embodiment of the disclosure.

FIG. 6 is a view showing the board secured to the rear chassis according to an embodiment. FIG. 7 is a view showing the board secured to the rear chassis, according to an embodiment.

As shown in FIG. 6, the fixing protrusion 30 of the rear chassis 10 may be inserted into the insertion hole 140 of the board 100 before the board 100 is secured to the rear chassis 10. By ensuring that the fixing protrusion 30 of the rear chassis 10 is inserted into the insertion hole 140 of the board 100 before the board 100 is secured to the rear chassis 10, the board 100 may be prevented from lifting.

In addition, the guide protrusions 40 of the rear chassis 10 may be inserted into the guide holes 130 of the board 100 before the board 100 is secured to the rear chassis 10. At this time, the guide protrusions 40 may be located on an upper side of the guide holes 130. Here, the upper side may be a direction in which the board 100 slides into the insertion space 21, which is the direction of the arrow shown in the drawings.

With the fixing protrusion 30 of the rear chassis 10 being inserted into the insertion hole 140 of the board 100 and the guide protrusions 40 of the rear chassis 10 being inserted into the upper portion of the guide holes 130 of the board 100, the board 100 may be slidably moved in the direction of the arrow shown in the drawings in order to secure the board 100 to the rear chassis 10. At this time, the operator may prevent damage to the connector C by pushing on the protruding ribs 150 of the board 100.

By pushing the protruding ribs 150 of the board 100 to slide the board 100 in the direction of the arrow shown in the drawing, the insertion portion 110 of the board 100 may be inserted into the insertion space 21 formed by the insertion ribs 20. At this time, the board 100 may be guided and moved by the guide protrusions 40 inserted into the guide holes 130.

Figure 7:
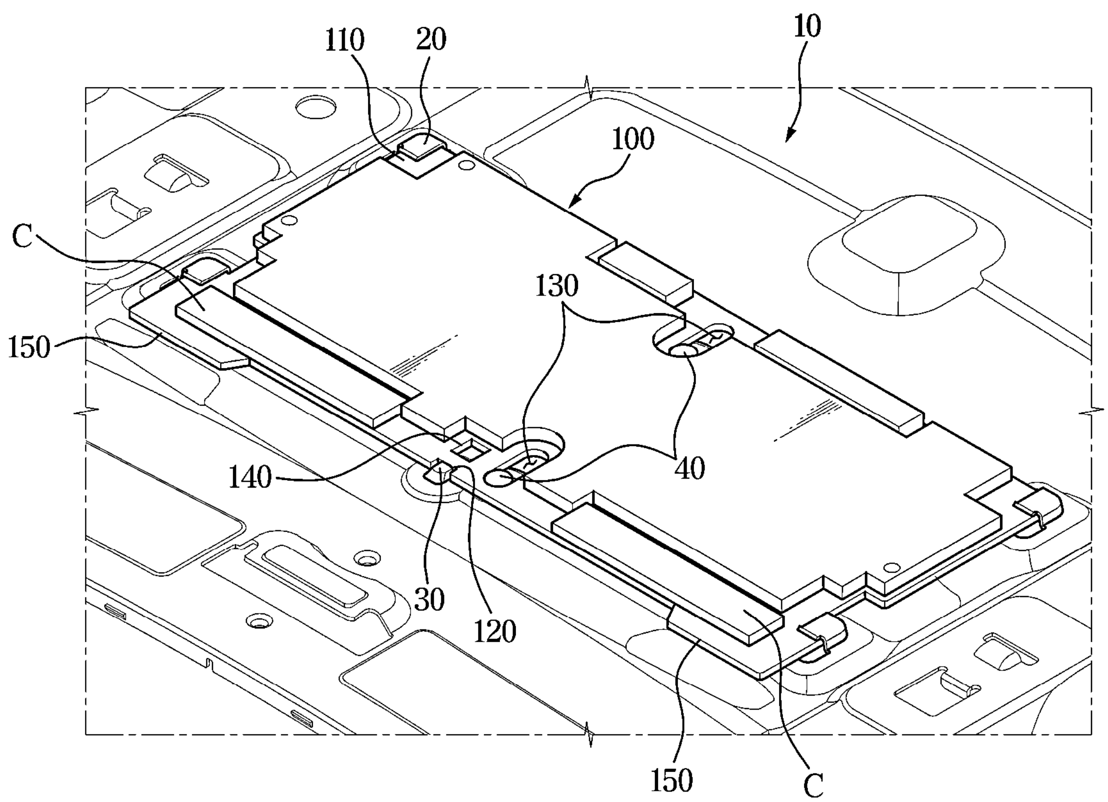
FIG. 7 is a view illustrating the board, according to an embodiment of the disclosure, secured to the rear chassis.

As shown in FIG. 7, in response to the insertion portion 110 of the board 100 being inserted into the insertion space 21, the fixing groove 120 of the board 100 may be secured to the fixing protrusion 30 of the rear chassis 10, so that the board 100 may be secured to the rear chassis 10. At this time, the guide protrusion 40 of the rear chassis 10 may be positioned on a lower side of the guide hole 130 of the board 100.

Figure 8:
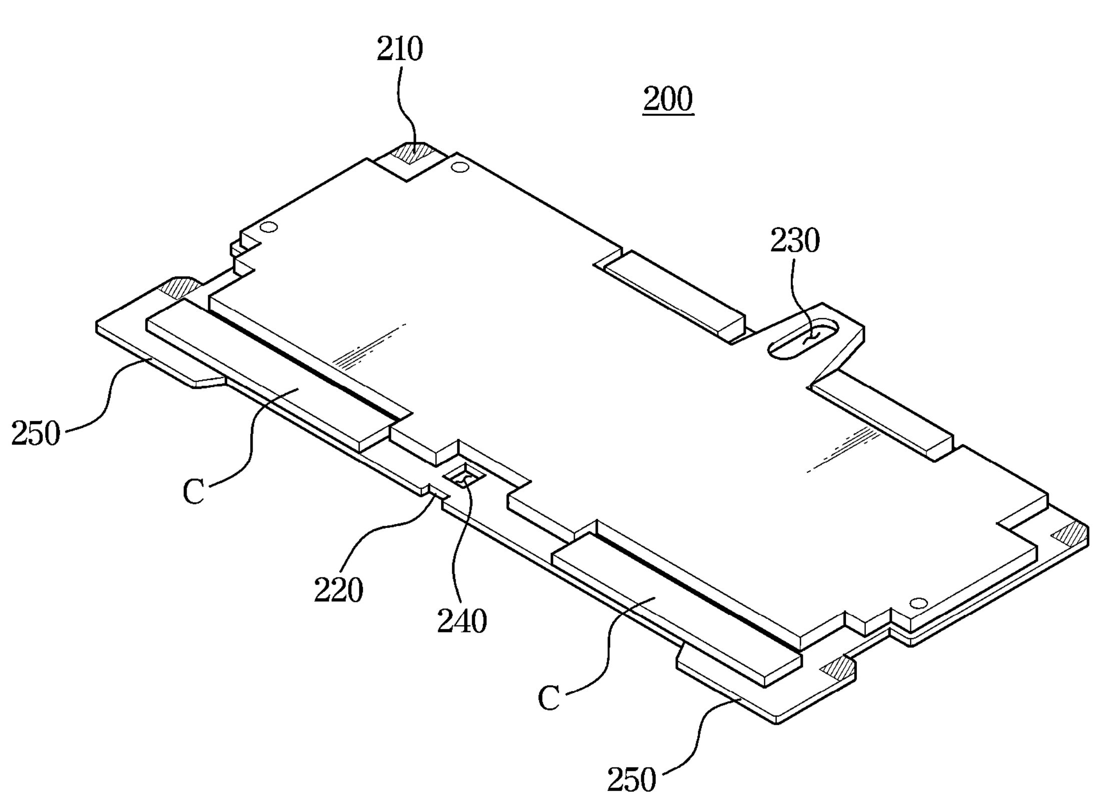
FIG. 8 is a view illustrating a board with a single guide hole, according to an embodiment of the disclosure.
Figure 9:
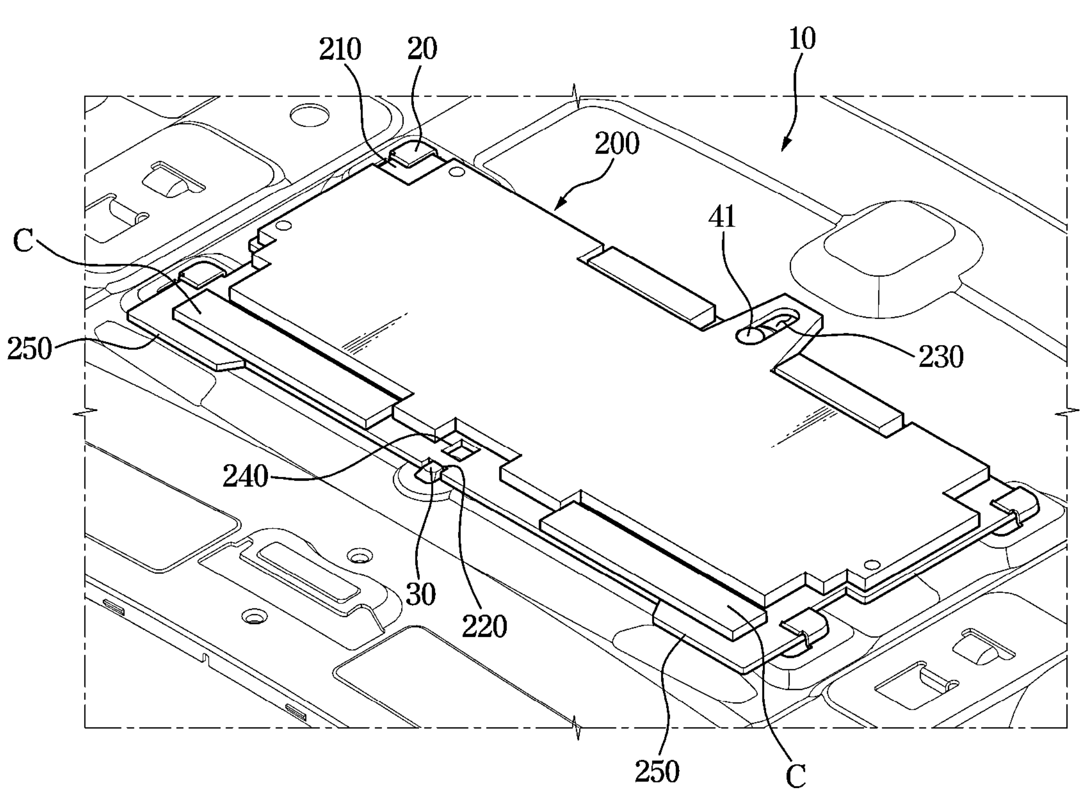
FIG. 9 is a view illustrating the board shown in FIG. 8 secured to a rear chassis, according to an embodiment of the disclosure.

FIG. 8 is a view showing a board provided with one guide hole, according to an embodiment. FIG. 9 is a view showing the board shown in FIG. 8 secured to a rear chassis according to an embodiment.

As shown in FIGS. 8 and 9, a board 200 may include a single guide hole 230. The rear chassis 10 to which the board 200 is secured may include a single guide protrusion 41 corresponding to the number of guide holes 230, which is provided as one.

Other configurations for securing the board 200 to the rear chassis 10, except for the configuration in which the rear chassis 10 includes the single guide protrusion 41 and the board 200 includes one guide hole 230, may be the same as the configurations of the board 100 and the rear chassis 10 shown in FIGS. 1 to 7.

In other words, the rear chassis 10 may include a plurality of insertion ribs 20 that forms the insertion space 21 into which the board 200 is slidably inserted. The rear chassis 10 may include the fixing protrusion 30 that slides into the insertion space 21 and secures the inserted board 200. The rear chassis 10 may include the single guide protrusion 41 that guides the board 200 to allow the board 200 to be slidably inserted into the insertion space 21.

The board 200 may include an insertion portion 210 that is inserted into the insertion space 21 of the rear chassis 10. The board 200 may include a fixing groove 220 secured to the fixing protrusion 30 of the rear chassis 10. The board 200 may include the guide hole 230 into which the guide protrusion 41 of the rear chassis 10 is inserted and the board 200 is guided by the guide protrusion 41. The board 200 may include an insertion hole 240 into which the fixing protrusion 30 of the rear chassis 10 is inserted before the board 200 is slid and inserted into the insertion space 21. The board 200 may include protruding ribs 250 that protrude beyond the connector C so that when the board 200 is pushed to insert into the insertion space 21 of the rear chassis 10, the board 100 may be pushed without touching the connector C.

As described above, since the other configurations, except for the configuration in which the rear chassis 10 includes the single guide protrusion 41 and the board 200 includes the single guide hole 230, are the same as the configurations of the board 100 and the rear chassis 10 shown in FIGS. 1 to 7. Accordingly, when the board 200 is secured to the rear chassis 10, the operation of securing the board 200 to the rear chassis 10 may be the same as the operation of securing the board 100 to the rear chassis 10 shown in FIGS. 6 to 7, except that the single guide hole 230 is guided by the single guide protrusion 41.

Figure 10:
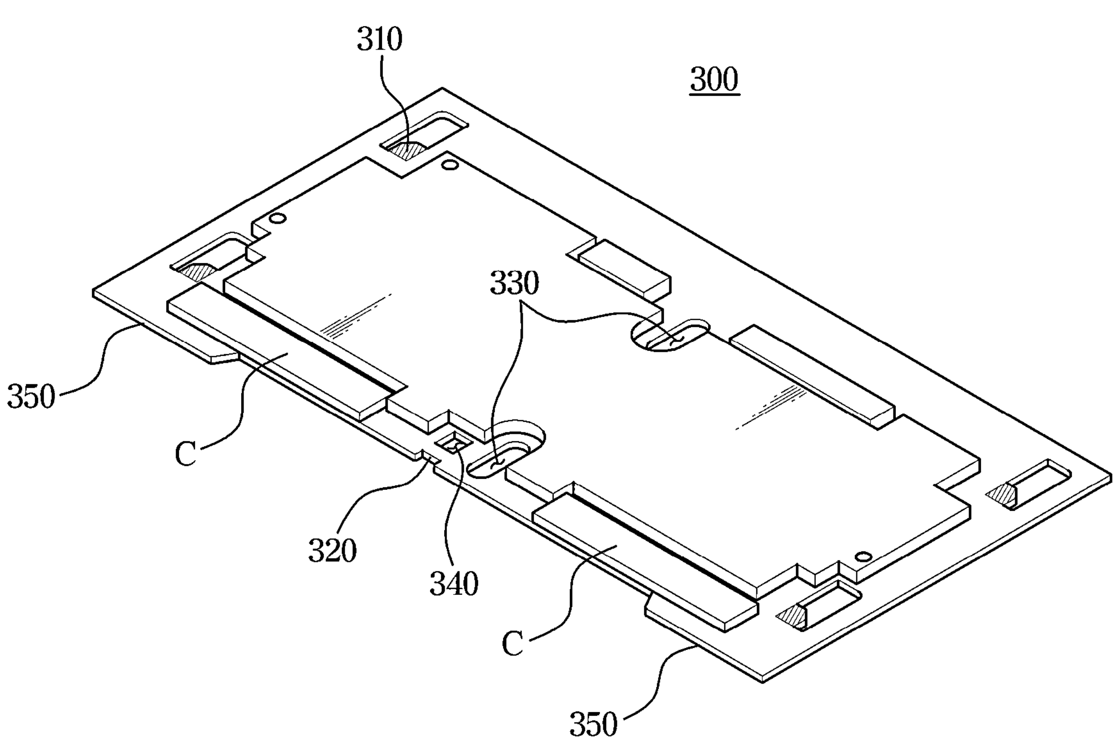
FIG. 10 is a view illustrating an insertion portion of a board provided in a portion adjacent to an edge of a board according to an embodiment of the disclosure.
Figure 11:
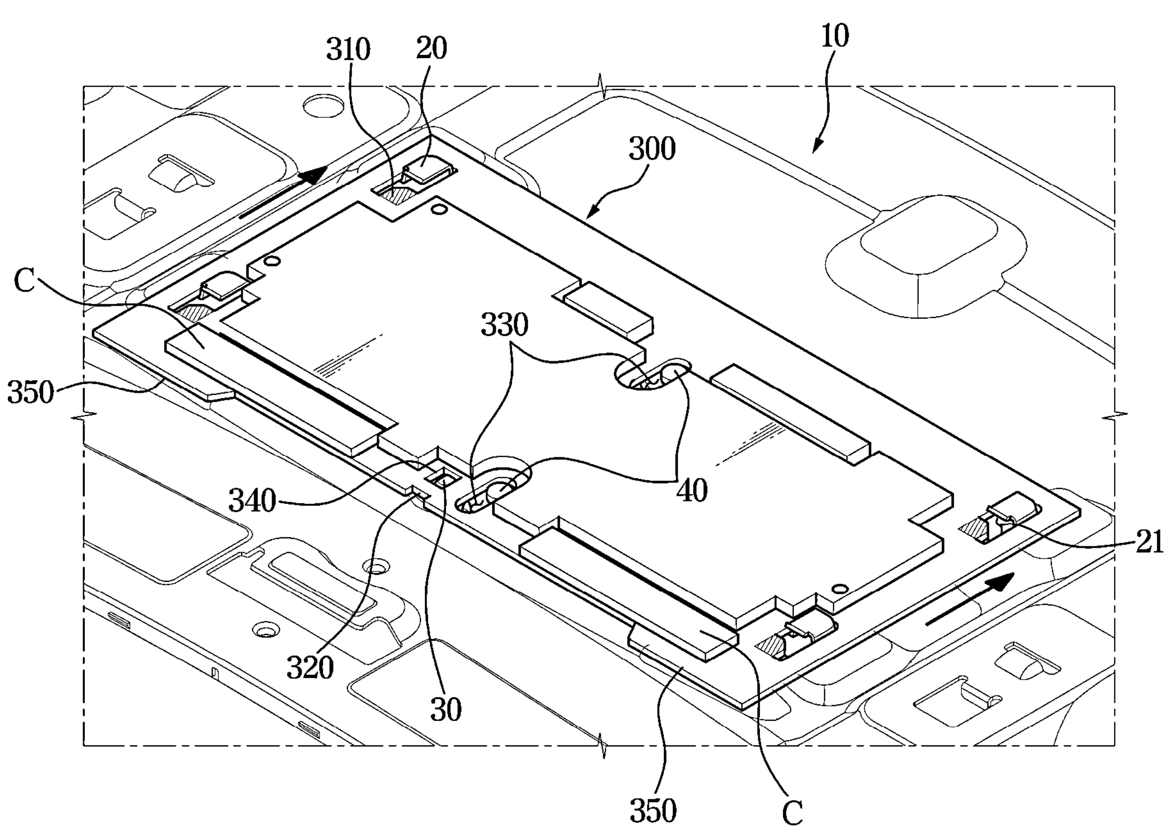
FIG. 11 is a view illustrating the board shown in FIG. 10 being secured to a rear chassis, according to an embodiment of the disclosure.
Figure 12:
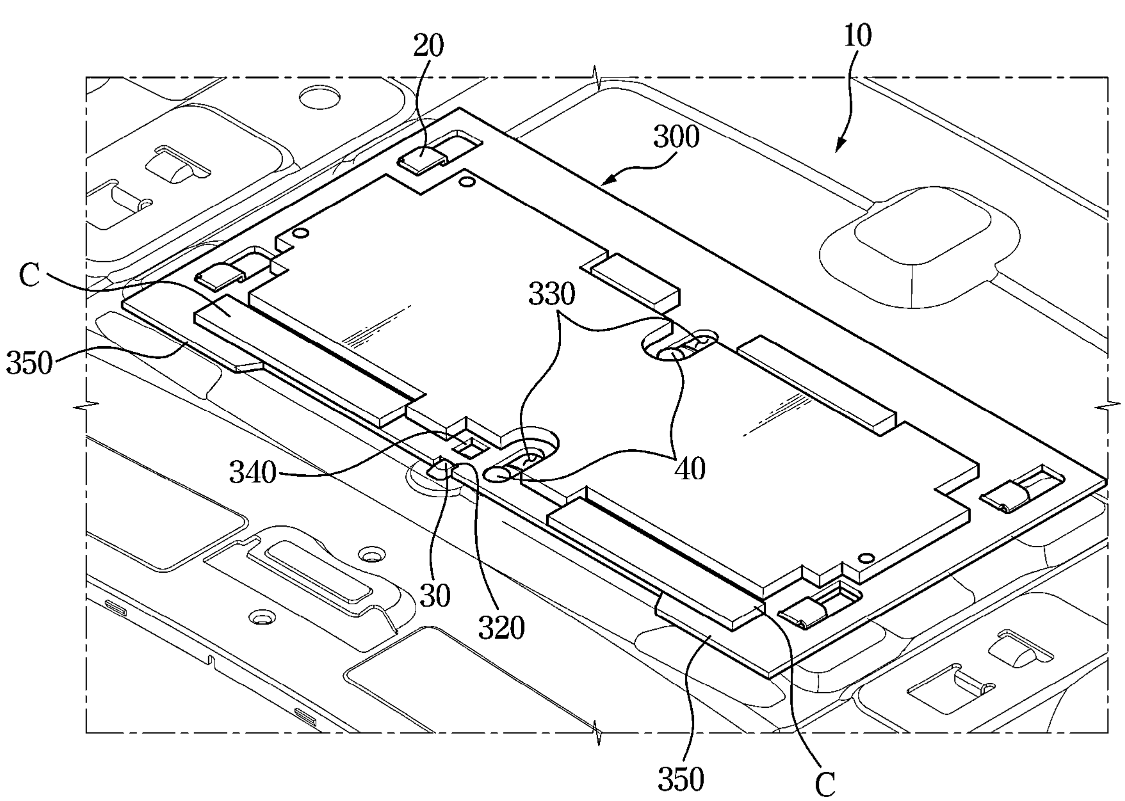
FIG. 12 is a view illustrating the board shown in FIG. 10 being secured to the rear chassis, according to an embodiment of the disclosure.

FIG. 10 is a view showing an insertion portion of a board provided in a portion adjacent to an edge of a board according to an embodiment. FIG. 11 is a view showing the board shown in FIG. 10 being secured to a rear chassis, according to an embodiment. FIG. 12 is a view showing the board shown in FIG. 10 being secured to the rear chassis, according to an embodiment.

As shown in FIGS. 10 to 12, when a board 300 is large in size, an insertion portion 310 of the board 300 may be provided in a portion adjacent to an edge of the board 300, rather than at the edge of the board 300. This may be to correspond to a position of the insertion portion 310 of the board 300 and the insertion space 21 of the rear chassis 10 into which the insertion portion 310 of the board 300 is inserted. Other configurations of the board 300 except the position of the insertion portion 310 of the board 300 may be the same as those of the board 100 shown in FIGS. 1 to 7.

In particular, the board 300 may include the insertion portion 310 that is inserted into the insertion space 21 of the rear chassis 10. The board 300 may include a fixing groove 320 secured to the fixing protrusion 30 of the rear chassis 10. The board 300 may include a guide hole 330 into which the guide protrusion 40 of the rear chassis 10 is inserted and the board 300 is guided by the guide protrusion 40. The board 300 may include an insertion hole 340 into which the fixing protrusion 30 of the rear chassis 10 is inserted before the board 300 is slid and inserted into the insertion space 21. The board 300 may include protruding ribs 350 that protrude above the connector C so that when the board 200 is pushed to insert into the insertion space 21 of the rear chassis 10, the board 300 may be pushed without touching the connector C.

The configuration of the rear chassis 10 may be the same as that of the rear chassis 10 shown in FIGS. 1 to 7.

As described above, since other configurations are the same as those of the board 100 and the rear chassis 10 shown in FIGS. 1 to 7, except for the different position of the insertion portion 310 formed in the board 300, the operation of securing the board 300 to the rear chassis 10 may be the same as that of fastening the board 100 to the rear chassis 10 shown in FIGS. 6 and 7.

Figure 13:
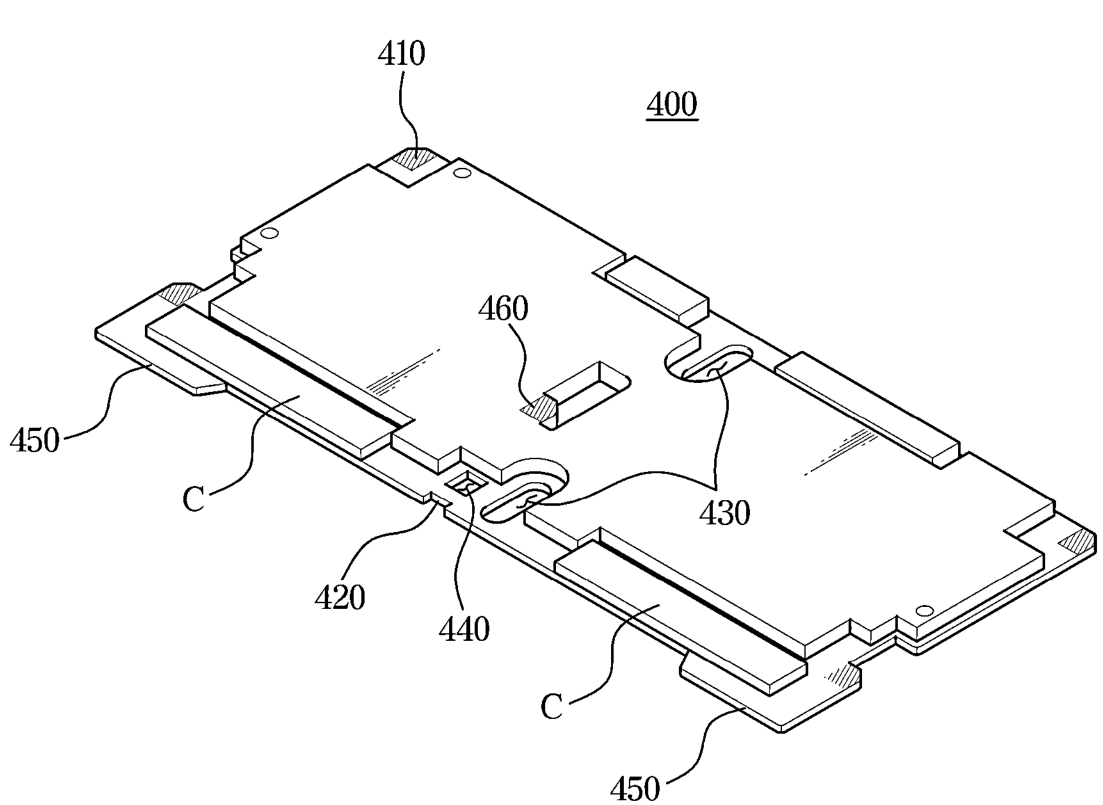
FIG. 13 is a view illustrating an auxiliary insertion portion of a board provided in a central portion of the board according to an embodiment of the disclosure.
Figure 14:
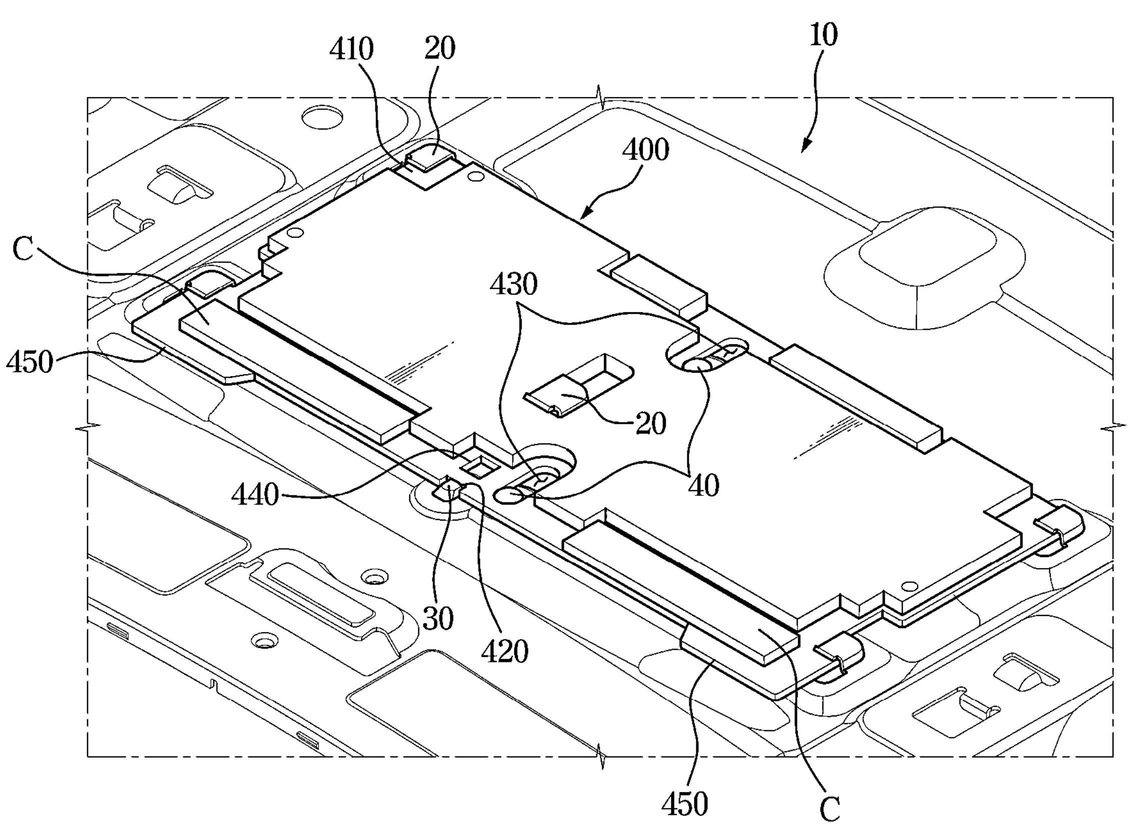
FIG. 14 is a view illustrating the board shown in FIG. 13 being secured to the rear chassis according to an embodiment of the disclosure.

FIG. 13 is a view showing an auxiliary insertion portion of a board provided in a central portion of the board according to an embodiment. FIG. 14 is a view showing the board shown in FIG. 13 being secured to the rear chassis according to an embodiment.

As shown in FIGS. 13 and 14, when a board 400 has a thin in thickness, an auxiliary insertion portion 460 may be provided in a central portion of the board 400. When the thickness of the board 400 is thin, the insertion portion 410 provided on the edge of the board 400 alone may cause the central portion of the board 400 to deform (e.g., bend) or allow the board 400 to flex (e.g., move). To prevent such a situation, the auxiliary insertion portion 460 may be provided in the central portion of the board 400. The auxiliary insertion portion 460 may also be provided in the case of the large size of the board 400. Other configurations of the board 400 except that the auxiliary insertion portion 460 is provided in the central portion of the board 400 may be the same as those of the board 100 shown in FIGS. 1 to 7.

In particular, the board 400 may include the insertion portion 410 that is inserted into the insertion space 21 of the rear chassis 10. The board 400 may include a fixing groove 420 secured to the fixing protrusion 30 of the rear chassis 10. The board 400 may include a guide hole 430 into which the guide protrusion 40 of the rear chassis 10 is inserted and the board 300 is guided by the guide protrusion 40. The board 400 may include an insertion hole 440 into which the fixing protrusion 30 of the rear chassis 10 is inserted before the board 400 is slid and inserted into the insertion space 21. The board 400 may include protruding ribs 450 that protrude beyond the connector C so that when the board 400 is pushed to insert into the insertion space 21 of the rear chassis 10, the board 400 may be pushed without touching the connector C.

Other configurations of the rear chassis 10 may be the same as the rear chassis 10 shown in FIGS. 1 to 7, except that the insertion ribs 20 forming the insertion space 21 into which the auxiliary insertion portion 460 of the board 400 is slidably inserted are further provided in a position corresponding to the auxiliary insertion portion 460. An insertion rib that corresponds to the auxiliary insertion portion 460 may be referred to as an auxiliary insertion rib.

As described above, since other configurations except that the auxiliary insertion portion 460 is provided in the central portion of the board 400 and the insertion ribs 20 forming the insertion space 21 into which the auxiliary insertion portion 460 of the board 400 is slidably inserted are further provided in a position of the rear chassis 10 corresponding to the auxiliary insertion portion 460 are the same as the configurations of the board 100 and the rear chassis 10 shown in FIGS. 1 to 7, when the board 400 is secured to the rear chassis 10, the operation of the board 400 being secured to the rear chassis 10 may be the same as the operation of the board 100 being secured to the rear chassis 10 shown in FIGS. 6 to 7, except that the auxiliary insertion portion 460 of the board 400 is slidably inserted into the insertion space 21 of the rear chassis 10.

Figure 15:
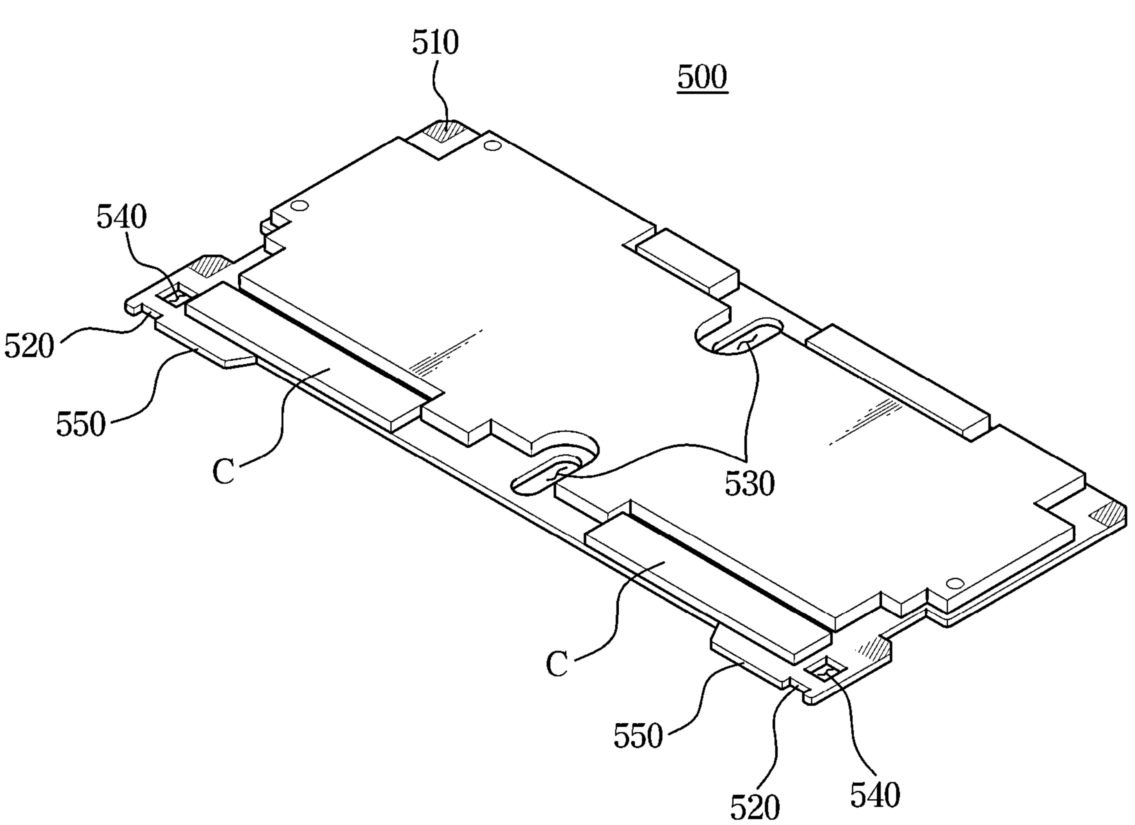
FIG. 15 is a view illustrating a board provided with two fastening grooves, according to an embodiment of the disclosure.
Figure 16:
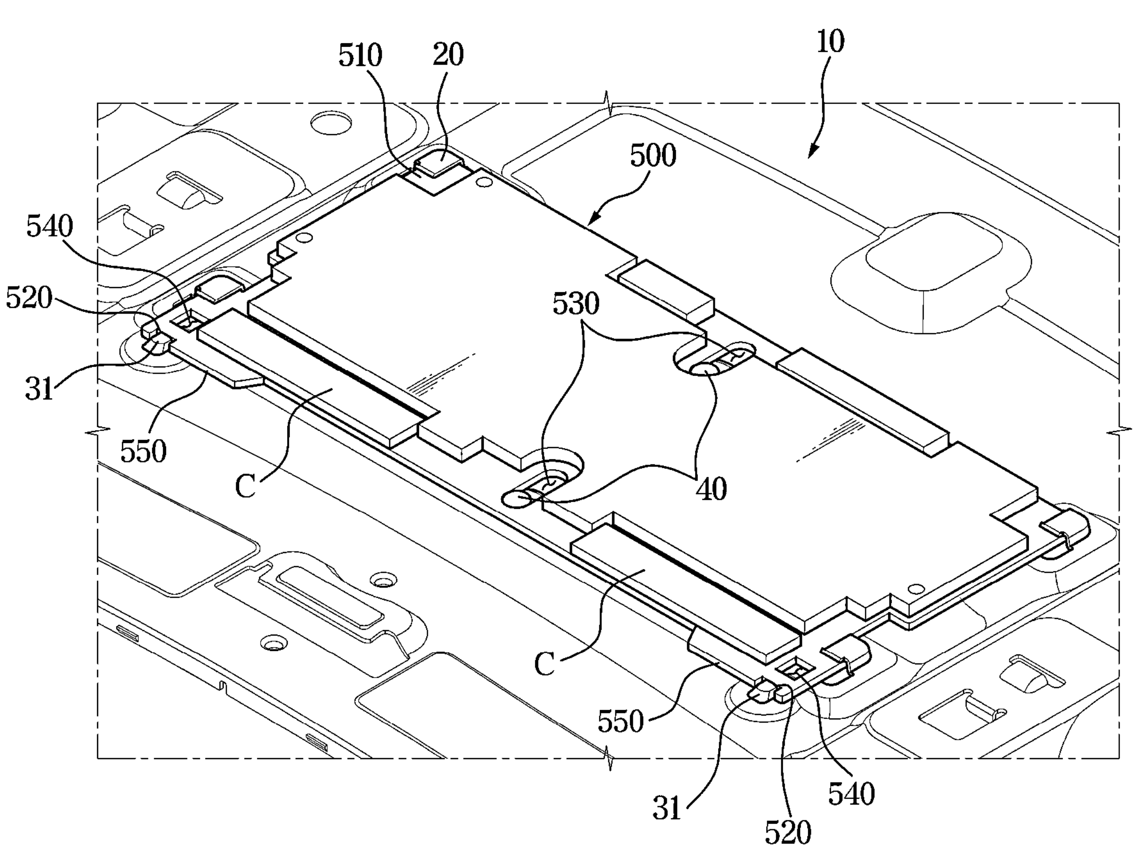
FIG. 16 is a view illustrating the board shown in FIG. 15 being secured to a rear chassis, according to an embodiment of the disclosure.

FIG. 15 is a view showing a board provided with two fixing grooves according to an embodiment. FIG. 16 is a view showing the board shown in FIG. 15 secured to a rear chassis.

As shown in FIGS. 15 and 16, a board 500 may include two fixing grooves 520. The rear chassis 10 to which the board 500 is secured may include two fixing protrusions 31 corresponding to the number of two fixing grooves 520. Since the rear chassis 10 is provided with two fixing protrusions 31, the board 500 may include two insertion holes 540.

Based on a direction in which the board 500 is inserted into the insertion space 21 being upward, the two fixing grooves 520 provided in the board 500 may be provided on each of left and right sides of a lower edge of the board 500. The two insertion holes 540 provided in the board 500 may be provided on an upper portion of the fixing groove 520, one each of left and right sides of the lower edge of the board 500.

Two fixing protrusions 31 provided on the rear chassis 10 may be provided at positions corresponding to the fixing grooves 520 provided in the board 500.

Other configurations for securing the board 500 to the rear chassis 10, except that the configuration in which the rear chassis 10 includes two fixing protrusions 31 and the board 500 includes two fixing grooves 520 and two insertion holes 540, may be the same as those of the board 100 and the rear chassis 10 shown in FIGS. 1 to 7.

In particular, the rear chassis 10 may include the plurality of insertion ribs 20 forming the insertion space 21 into which the board 500 is slidably inserted. The rear chassis 10 may include the fixing protrusions 31 that slide into the insertion space 21 and secure the inserted board 500. The rear chassis 10 may include the guide protrusions 40 that guide the board 500 to allow the board 500 to be slidably inserted into the insertion space 21.

The board 500 may include an insertion portion 510 inserted into the insertion space 21 of the rear chassis 10. The board 500 may include the fixing grooves 520 secured to the fixing protrusions 31 of the rear chassis 10. The board 500 may include guide holes 530 into which the guide protrusions 40 of the rear chassis 10 are inserted and the board 500 is guided by the guide protrusions 40. The board 500 may include the insertion holes 540 into which the fixing protrusions 31 of the rear chassis 10 are inserted before the board 500 is slid and inserted into the insertion space 21. The board 500 may include protruding ribs 550 that protrude beyond the connector C so that when the board 500 is pushed to insert into the insertion space 21 of the rear chassis 10, the board 500 may be pushed without touching the connector C.

As described above, since other configurations, except that the rear chassis 10 includes two fixing protrusions 31 and the board 500 includes two fixing grooves 520 and two insertion holes 540, are the same as the configurations of the board 100 and the rear chassis 10 shown in FIGS. 1 to 7, when the board 500 is secured to the rear chassis 10, the operation may be the same as identical to the operation of securing the board 100 shown in FIGS. 6 and 7 to the rear chassis 10, except that before securing, the two fixing protrusions 31 are inserted into the two insertion holes 540, and after securing, the two fixing grooves 520 are secured to the two fixing protrusions 31.

The display apparatus according to an embodiment of the present disclosure may include the rear chassis 10 and the boards 100, 200, 300, 400, and 500 secured to the rear chassis. The rear chassis may include the insertion rib 20 that forms the insertion space 21 into which the board is slidably inserted, and the fixing protrusions 30 and 31 that secure the board inserted into the insertion space. The board may include the insertion portions 110, 210, 310, 410, and 510 provided on the edge of the board and slidably inserted into the insertion space, and the fixing grooves 120, 220, 320, 420, and 520 secured to the fixing protrusions in response to the insertion portion being inserted into the insertion space. According to the present disclosure, the boards 100, 200, 300, 400, and 500 may be not secured to the rear surface of the rear chassis 10 by screws or rugs, but be inserted into the insertion space 21 by a sliding method, thereby reducing material costs. Since the boards 100, 200, 300, 400, and 500 may be secured to the rear surface of the rear chassis 10 by a sliding method, the operator's process cost for securing the boards 100, 200, 300, 400, and 500 to the rear surface of the rear chassis 10 may be reduced. Since the boards 100, 200, 300, 400, and 500 may be secured to the rear surface of the rear chassis 10 by a sliding method, the work time for securing the boards 100, 200, 300, 400, and 500 to the rear surface of the rear chassis 10 may be reduced, thereby improving productivity. After the boards 100, 200, 300, 400, and 500 are slidably secured to the rear surface of the rear chassis 10, the boards 100, 200, 300, 400, and 500 may be prevented from sliding back by an impact or the self-weight of the boards 100, 200, 300, 400, and 500 in the direction opposite to the direction in which the boards 100, 200, 300, 400, and 500 are secured, thereby preventing the boards 100, 200, 300, 400, and 500 from deviating from the insertion space 21. Since the area of the insertion portions 110, 210, 310, 410, and 510 occupies only the minimal area of the total area of the boards 100, 200, 300, 400, and 500, the board 100, 200, 300, 400, and 500 may be minimized. Since the sizes of the boards 100, 200, 300, 400, and 500 are minimized, material costs may be reduced. Sufficient space may be secured for the boards 100, 200, 300, 400, and 500 to be placed. Sufficient space may be secured for cables disposed at the rear surface of the rear chassis 10.

The rear chassis may further include the guide protrusions 40 and 41 configured to guide the boards 100, 200, 300, 400, and 500 to be inserted into the insertion space. According to the present disclosure, when the boards 100, 200, 300, 400, and 500 slide, the boards 100, 200, 300, 400, and 500 may be guided by the guide protrusion 40 of the rear chassis 10. Accordingly, when the boards 100, 200, 300, 400, and 500 are inserted into the insertion space 21, the insertion portions 110, 210, 310, 410, and 510 of the boards 100, 200, 300, 400, and 500 may be inserted into the insertion space 21 without being caught by the insertion rib 20 of the chassis 10.

The boards 100, 200, 300, 400, and 500 may further include guide holes 130 and 230 into which the guide protrusions are inserted. According to the present disclosure, since the boards 100, 200, 300, 400, and 500 may be guided by the guide protrusions 40 and 41 of the rear chassis 10 and the guide holes 130, 230, 330, 430, and 530 of the boards 100, 200, 300, 400, and 500 when the boards 100, 200, 300, 400, and 500 slide, the insertion portions 110, 210, 310, 410, and 510 may be inserted into the insertion space without being caught by the insertion rib 20 of the rear chassis 10 when the boards 100, 200, 300, 400, and 500 are inserted into the insertion space 21.

The guide hole may be formed to be elongated in the direction in which the board is inserted into the insertion space to allow the board to be guided by the guide protrusion in response to the insertion portion being inserted into the insertion space.

The insertion ribs may be provided in a plurality, and each of the plurality of insertion ribs may form the insertion space.

The insertion portions may be provided in a plurality corresponding to the number of the plurality of insertion ribs.

The insertion portion may be configured to have an area corresponding to the insertion rib covering the upper surface of the insertion portion when the insertion portion is inserted into the insertion space. According to the present disclosure, since the area of the insertion portions 110, 210, 310, 410, and 510 occupies only the minimal area of the total area of the boards 100, 200, 300, 400, and 500, the boards 100, 200, 300, 400, and 500 may be minimized. Since the sizes of the boards 100, 200, 300, 400, and 500 are minimized, material costs may be reduced. Sufficient space for arranging the boards 100, 200, 300, 400, and 500 may be secured. Sufficient space for cables placed at the rear surface of the rear chassis 10 may be secured.

The insertion portion may be a portion in which the configuration of circuit components and patterns is restricted.

The board may further include the insertion holes 140, 240, 340, 440, and 540 into which the fixing protrusions are inserted before the boards are inserted into the insertion space to prevent the boards from being lifted by the fixing protrusions. According to the present disclosure, before the boards 100, 200, 300, 400, and 500 are inserted into the insertion space 21, the fixing protrusions 30 and 31 of the rear chassis 10 are inserted into the insertion holes 140, 240, 340, 440, and 550, it is possible to prevent the boards 100, 200, 300, 400, and 500 from being lifted by the fixing protrusions 30 and 31.

A connector C may be mounted on the board, and the board may further include the protruding rib 150 formed to protrude beyond the connector to prevent damage to the connector when the board is pushed to insert the board into the insertion space. According to the present disclosure, when the boards 100, 200, 300, 400, and 500 are secured to the rear chassis 10, damage to the connector C may be prevented.

The guide holes 130 may be provided in a pair, and the guide protrusions 40 may be provided in a pair corresponding to the number of guide holes.

The guide hole 230 may be provided as a single one, and the guide protrusion 41 may be provided as a single one corresponding to the number of guide holes.

Based on the direction in which the boards 100, 200, 300, and 400 is inserted into the insertion space being assumed to be upward, the fixing grooves 120, 220, 320, and 420 may be provided as a single one in the central portion of the lower edge of the board.

Based on the direction in which the board is inserted into the insertion space being assumed to be upward, the fixing groove 520 may be provided on each of left and right sides of the lower edge of the board 500.

The board 400 may further include the auxiliary insertion portion 460 provided in the central portion of the board, and the rear chassis may further include the insertion rib that forms the insertion space into which the auxiliary insertion portion slidably inserted and is disposed at a position corresponding to the auxiliary insertion portion. According to the present disclosure, even when the thickness of the board 400 is thin, it is possible to prevent the central portion of the board 400 from deforming or the board 400 from flexing.

The display apparatus according to an embodiment of the present disclosure may include the rear chassis 10 and the boards 100, 200, 300, 400, and 500 secured to the rear chassis. The rear chassis may include the insertion rib 20 forming the insertion space 21 into which the board is slidably inserted, the fixing protrusions 30 and 31 that secure the board inserted into the insertion space, and the guide protrusions 40 and 41 that guide the board to be inserted into the insertion space. The board may include the insertion portions 110, 210, 310, 410, and 510 provided on the edge of the board and slidably inserted into the insertion space, the fixing grooves 120, 220, 320, 420, and 520 that are secured to the fixing protrusions when the insertion portion is inserted into the insertion space, and guide holes 130, 230, 330, 430, and 530 into which the guide protrusions are inserted and guiding the guide protrusions. According to the present disclosure, the boards 100, 200, 300, 400, and 500 may be not secured to the rear surface of the rear chassis 10 by screws or rugs, but be inserted into the insertion space 21 by a sliding method, thereby reducing material costs. Since the boards 100, 200, 300, 400, and 500 may be secured to the rear surface of the rear chassis 10 by a sliding method, the operator's process cost for securing the boards 100, 200, 300, 400, and 500 to the rear surface of the rear chassis 10 may be reduced. Since the boards 100, 200, 300, 400, and 500 may be secured to the rear surface of the rear chassis 10 by a sliding method, the work time for securing the boards 100, 200, 300, 400, and 500 to the rear surface of the rear chassis 10 may be reduced, thereby improving productivity. After the boards 100, 200, 300, 400, and 500 are slidably secured to the rear surface of the rear chassis 10, the boards 100, 200, 300, 400, and 500 may be prevented from sliding back by an impact or the self-weight of the boards 100, 200, 300, 400, and 500 in the direction opposite to the direction in which the boards 100, 200, 300, 400, and 500 are secured, thereby preventing the boards 100, 200, 300, 400, and 500 from deviating from the insertion space 21. Since the area of the insertion portions 110, 210, 310, 410, and 510 occupies only the minimal area of the total area of the boards 100, 200, 300, 400, and 500, the board 100, 200, 300, 400, and 500 may be minimized. Since the sizes of the boards 100, 200, 300, 400, and 500 are minimized, material costs may be reduced. Sufficient space may be secured for the boards 100, 200, 300, 400, and 500 to be placed. Sufficient space may be secured for cables disposed at the rear surface of the rear chassis 10.

The insertion portion may be formed only on a portion of the edge of the board, which is inserted into the insertion space. According to the present disclosure, since the area of the insertion portions 110, 210, 310, 410, and 510 occupies only the minimal area of the total area of the boards 100, 200, 300, 400, and 500, the boards 100, 200, 300, 400, and 500 may be minimized. Since the sizes of the boards 100, 200, 300, 400, and 500 are minimized, material costs may be reduced. Sufficient space for arranging the boards 100, 200, 300, 400, and 500 may be secured. Sufficient space for cables placed at the rear surface of the rear chassis 10 may be secured.

The insertion portion may be a portion in which the configuration of circuit components and patterns is limited, and may occupy only an area corresponding to the portion inserted into the insertion space in the total area of the board. According to the present disclosure, since the area of the insertion portions 110, 210, 310, 410, and 510 occupies only the minimal area of the total area of the boards 100, 200, 300, 400, and 500, the boards 100, 200, 300, 400, and 500 may be minimized. Since the sizes of the boards 100, 200, 300, 400, and 500 are minimized, material costs may be reduced. Sufficient space for arranging the boards 100, 200, 300, 400, and 500 may be secured. Sufficient space for cables placed at the rear surface of the rear chassis 10 may be secured.

The board may further include the insertion holes 410, 240, 340, 440, and 540 into which the fixing protrusions are inserted to prevent the board from being lifted by the fixing protrusions. According to the present disclosure, before the boards 100, 200, 300, 400, and 500 are inserted into the insertion space 21, the fixing protrusions 30 and 31 of the rear chassis 10 are inserted into the insertion holes 140, 240, 340, 440, and 550, it is possible to prevent the boards 100, 200, 300, 400, and 500 from being lifted by the fixing protrusions 30 and 31.

Before inserting the board into the insertion space, the fixing protrusions may be inserted into the insertion holes to facilitate insertion of the board into the insertion space.

The effects to be obtained from the present disclosure are not limited to those mentioned above, and other effects not mentioned will be apparent to those skilled in the art to which the present disclosure belongs from the following description.

Although certain example embodiments are illustrated and described above, the present disclosure is not limited to the certain embodiments, various applications may of course be performed by those skilled in the art without deviating from what is claimed in the scope of claims, and such applications should not be understood separately from the technical idea or prospects herein.

The invention claimed is:

1. A display apparatus comprising:

a rear chassis; and a board that is securable to the rear chassis;

wherein the rear chassis includes:

an insertion rib forming an insertion space into which the board is slidably insertable in a first direction, and a fixing protrusion, the board includes:

an insertion portion on an edge of the board and slidably insertable into the insertion space, and a fixing groove, and the rear chassis and the board are configured so that, when the insertion portion of the board is slidably inserted into the insertion space of the rear chassis, the fixing protrusion is inserted into the fixing groove to secure the board to the rear chassis so that the fixing protrusion prevents the board from moving in a second direction opposite to the first direction.

2. The display apparatus of claim 1, wherein the rear chassis includes a guide protrusion configured to guide the board as the insertion portion is being slidably inserted into the insertion space.

3. The display apparatus of claim 2, wherein the board includes a guide hole into which the guide protrusion is insertable.

4. The display apparatus of claim 3, wherein the guide hole is elongated in the first direction in which the board moves as the insertion portion is being slidably inserted into the insertion space so that the board is guided by the guide protrusion when the insertion portion is being slidably inserted into the insertion space.

5. The display apparatus of claim 1, wherein the insertion rib includes a plurality of insertion ribs, and the insertion space is formed by each insertion rib of the plurality of insertion ribs.

6. The display apparatus of claim 5, wherein the insertion portion includes a plurality of insertion portions, and each insertion portion of the plurality of insertion portions respectively corresponds to one insertion rib of the plurality of insertion ribs.

7. The display apparatus of claim 1, wherein the insertion portion is configured to have an area corresponding to the insertion rib covering a surface of the insertion portion when the insertion portion is inserted into the insertion space.

8. The display apparatus of claim 7, wherein the insertion portion is a portion of the board in which a configuration of circuit components and patterns is restricted.

9. The display apparatus of claim 1, wherein the board includes an insertion hole into which the fixing protrusion is insertable before the insertion portion is slidably inserted into the insertion space to prevent the board from being lifted by the fixing protrusion.

10. The display apparatus of claim 1, wherein a connector is mounted on the board, and the board includes a protruding rib protruding beyond the connector to prevent damage to the connector when the board is pushed to slidably insert the insertion portion into the insertion space.

11. The display apparatus of claim 3, wherein the guide hole includes a pair of guide holes, and the guide protrusion includes a pair of guide protrusions corresponding to the pair of guide holes.

12. The display apparatus of claim 1, wherein the fixing protrusion is configured to be slidably insertable into the fixing groove.

13. The display apparatus of claim 1, wherein the fixing groove is provided in a central portion of a lower edge of the board based on the first direction being an upward direction.

14. The display apparatus of claim 1, wherein the fixing groove includes a pair of fixing grooves provided respectively on each of left and right sides of a lower edge of the board based on the first direction being an upward direction.

15. The display apparatus of claim 1, wherein the board includes an auxiliary insertion portion provided in a central portion of the board, and the rear chassis includes an auxiliary insertion rib that forms an insertion space into which the auxiliary insertion portion is slidably insertable and is disposed at a position corresponding to the auxiliary insertion portion.

* * * * *